(12) United States Patent
May

(10) Patent No.: US 7,761,368 B2
(45) Date of Patent: Jul. 20, 2010

(54) SYSTEMS AND METHODS FOR CONDUCTING DERIVATIVE TRADES ELECTRONICALLY

(75) Inventor: Richard Raymond May, Mathews, NC (US)

(73) Assignee: Blackbird Holdings, Inc., Charlotte, NC (US)

( * ) Notice: Subject to any disclaimer, the term of this patent is extended or adjusted under 35 U.S.C. 154(b) by 65 days.

(21) Appl. No.: 11/739,497

(22) Filed: Apr. 24, 2007

(65) Prior Publication Data

US 2007/0282733 A1 Dec. 6, 2007

Related U.S. Application Data

(63) Continuation of application No. 09/859,901, filed on May 16, 2001, now abandoned.

(60) Provisional application No. 60/204,717, filed on May 16, 2000.

(51) Int. Cl.
*G06Q 40/00* (2006.01)
(52) U.S. Cl. ...................................... 705/37
(58) Field of Classification Search ............ 705/37
See application file for complete search history.

(56) References Cited

U.S. PATENT DOCUMENTS

| 3,573,747 A | 4/1971 | Adams et al. |
| 3,581,072 A | 5/1971 | Nymeyer |
| 4,674,044 A | 6/1987 | Kalmus et al. |
| 4,677,552 A | 6/1987 | Sibley, Jr. |
| 4,799,156 A | 1/1989 | Shavit et al. |
| 4,903,201 A | 2/1990 | Wagner |

(Continued)

FOREIGN PATENT DOCUMENTS

EP 0 399 850 A2 11/1990

(Continued)

OTHER PUBLICATIONS

Jerome Yen, Ho Geun, Lee and Tung Bui; *Intelligent Clearinghouse: Electronic Marketplace with Computer-Mediated Negotiation Supports*; Proceedings of the Twenty-Ninth Hawaii International Conference on System Sciences, Proceedings of HICSS-29; 29th Hawaii International conference on System Sciences, Wailea, HI, US, Jan. 3-6, 1996; pp. 219-2217, vol. 3; XP002097382 ISBN 0-8186-7330-3, 1996; Los Alamitos, California, IEEE Computer Soc. Press.

(Continued)

*Primary Examiner*—Jagdish N Patel
*Assistant Examiner*—Sara Chandler
(74) *Attorney, Agent, or Firm*—Alston & Bird LLP

(57) ABSTRACT

The present invention facilitates efficient negotiations of trade terms and the generation of an electronic trade ticket in the trading of financial instruments. The negotiation process is preferably conducted through a secure online chat program using point-to-point messaging, though the negotiations can take place using the tradition exchanges of phone calls and faxes outside of the confines of an electronic trading system. Once the trade terms have been agreed upon by both parties, then the parties enter an electronic trading system in accordance with the present invention to select the traded financial instrument and generate an electronic trade ticket with can be stored by the trading system and/or the each of the trading parties.

19 Claims, 6 Drawing Sheets

U.S. PATENT DOCUMENTS

| | | |
|---|---|---|
| 4,953,085 A | 8/1990 | Atkins |
| 4,980,826 A | 12/1990 | Wagner |
| 5,003,473 A | 3/1991 | Richards |
| 5,077,665 A | 12/1991 | Silverman et al. |
| 5,101,353 A | 3/1992 | Lupien et al. |
| 5,126,936 A | 6/1992 | Champion et al. |
| 5,136,501 A | 8/1992 | Silverman et al. |
| 5,168,446 A | 12/1992 | Wiseman |
| 5,193,056 A | 3/1993 | Boes |
| 5,258,383 A | 11/1993 | Nagamura et al. |
| 5,258,908 A | 11/1993 | Hartheimer et al. |
| 5,270,922 A | 12/1993 | Higgins |
| 5,285,383 A | 2/1994 | Lindsey et al. |
| 5,297,031 A | 3/1994 | Gutterman et al. |
| 5,375,055 A | 12/1994 | Togher et al. |
| 5,396,552 A | 3/1995 | Jahn et al. |
| 5,446,885 A | 8/1995 | Moore et al. |
| 5,517,406 A | 5/1996 | Harris et al. |
| 5,557,517 A | 9/1996 | Daughterty, III |
| 5,594,639 A | 1/1997 | Atsumi |
| 5,630,127 A | 5/1997 | Moore et al. |
| 5,644,727 A | 7/1997 | Atkins |
| 5,727,165 A | 3/1998 | Ordish et al. |
| 5,732,400 A | 3/1998 | Mandler et al. |
| 5,794,207 A | 8/1998 | Walker et al. |
| 5,794,219 A | 8/1998 | Brown |
| 5,799,287 A | 8/1998 | Dembo |
| 5,802,499 A | 9/1998 | Sampson et al. |
| 5,812,988 A | 9/1998 | Sandretto |
| 5,819,237 A | 10/1998 | Garman |
| 5,835,896 A | 11/1998 | Fisher et al. |
| 5,845,266 A | 12/1998 | Lupien et al. |
| 5,873,071 A | 2/1999 | Ferstenberg et al. |
| 5,905,974 A | 5/1999 | Fraser et al. |
| 5,915,209 A | 6/1999 | Lawrence |
| 5,924,082 A | 7/1999 | Silverman et al. |
| 5,924,083 A | 7/1999 | Silverman et al. |
| 5,940,810 A | 8/1999 | Traub et al. |
| 5,950,175 A | 9/1999 | Austin |
| 5,950,176 A | 9/1999 | Keiser et al. |
| 5,963,923 A | 10/1999 | Garber |
| 5,970,479 A | 10/1999 | Shepherd |
| 5,982,891 A | 11/1999 | Ginter et al. |
| 6,012,046 A | 1/2000 | Lupien et al. |
| 6,014,627 A | 1/2000 | Togher et al. |
| 6,014,643 A | 1/2000 | Minton |
| 6,029,146 A | 2/2000 | Hawkins |
| 6,098,051 A | 8/2000 | Lupien et al. |
| 6,134,536 A | 10/2000 | Shepherd |
| 6,134,600 A | 10/2000 | Liu |
| 6,157,918 A | 12/2000 | Shepherd |
| 6,161,099 A | 12/2000 | Harrington et al. |
| 6,195,647 B1 | 2/2001 | Martyn et al. |
| 6,260,025 B1 | 7/2001 | Silverman et al. |
| 6,282,521 B1 | 8/2001 | Howorka |
| 6,317,727 B1 * | 11/2001 | May .................. 705/36 R |
| 6,321,212 B1 | 11/2001 | Lange |
| 6,362,838 B1 | 3/2002 | Szlam et al. |
| 6,421,653 B1 * | 7/2002 | May .................. 705/36 R |
| 6,629,082 B1 | 9/2003 | Hambrecht et al. |
| 6,850,907 B2 | 2/2005 | Lutnick et al. |
| 6,912,510 B1 | 6/2005 | Shepherd |
| 6,963,856 B2 | 11/2005 | Lutnick et al. |
| 6,996,540 B1 | 2/2006 | May |
| 2001/0039527 A1 * | 11/2001 | Ordish et al. .................. 705/37 |
| 2002/0002530 A1 | 1/2002 | May |
| 2002/0099651 A1 | 7/2002 | May |
| 2002/0116317 A1 | 8/2002 | May |
| 2002/0138390 A1 | 9/2002 | May |
| 2003/0093360 A1 | 5/2003 | May |
| 2003/0220868 A1 | 11/2003 | May |
| 2003/0229571 A1 | 12/2003 | May |
| 2004/0015430 A1 | 1/2004 | May |
| 2004/0015431 A1 | 1/2004 | May |
| 2005/0160032 A1 | 7/2005 | Lutnick et al. |
| 2006/0059082 A1 | 3/2006 | Silverman et al. |
| 2006/0095363 A1 | 5/2006 | May |
| 2006/0190383 A1 | 8/2006 | May |
| 2007/0011079 A1 | 1/2007 | May |
| 2007/0219882 A1 | 9/2007 | May |
| 2007/0239591 A1 | 10/2007 | May |
| 2007/0288346 A1 | 12/2007 | May |

FOREIGN PATENT DOCUMENTS

| | | |
|---|---|---|
| EP | 0 407 026 A2 | 1/1991 |
| EP | 0 411 748 A2 | 2/1991 |
| EP | 0512702 A2 | 11/1992 |
| EP | 0790568 A1 | 8/1997 |
| EP | 1049037 A2 | 11/2000 |
| EP | 1072990 A2 | 1/2001 |
| WO | WO 95 06918 A | 3/1995 |
| WO | WO 96 05563 A | 2/1996 |
| WO | WO 96 34357 A | 10/1996 |
| WO | WO 97 03409 A | 1/1997 |
| WO | WO 99/19821 | 4/1999 |
| WO | WO 99/19821 A1 | 4/1999 |
| WO | WO 01/52091 A2 | 7/2001 |

OTHER PUBLICATIONS

Rabatin, Adaptive Portfolio Trading Strategies for Forex Portfolios, Journal, Apr. 1997, pp. 111, Issue 4, Rabatin Investment Technology.

Higgens, Managing the Risk of Your Global Bond Portfolio, Journal, Apr. 1996, pp. 1316, Issue 0951-3604, Global Investor.

Avanzato, How to Use The Collateral Carousel, Journal, Jan. 1998, pp. 2931, Issue 0262-6969, International Financial Law Review.

Ludwig, Supervision by Risk, Journal, Nov. 1995, pp. 5260, Issue 1062-6271, Journal of Commercial Lending.

Derivatives Tool Merger, Report, Feb. 19, 1996, p. 4, vol. 28, No. 4, Issue 10427252, Software Industry Report.

Maguire, Details on Derivatives AIG Breaks Down Exposure, Journal, Jun. 13, 1994, p. 1, vol. 4, No. 23, The Insurance Accountant.

TDC Symbology Guide, Article, Nov. 2001, pp. 1-14, Track Data Corporation, Brooklyn, United States.

Capeci, John; *Credit Risk, Credit Ratings, and Municipal Bond Yields: A Panel Study*; Proc. of Conf. on the Tax-Exempt Bond Market, National Tax Journal, vol. 44, No. 4, Dec. 1991; 11 pages.

Brady, Simon; *Bond Futures*, Euromoney Supplement, p. 3-4, Jun. 1992; 4 pages.

Neal, Robert; *Credit Derivatives: New Financial Instruments for Controlling Credit Risk*, Economic Review, vol. 81, No. 2, pp. 15-27, Second Quarter 1996; 11 pages.

Kojima, J. Christopher; *Product-Based Solutions to Financial Innovation: The Promise and Danger of Applying the Federal Securities Laws to OTC Derivatives (Over-The-Counter)*, Amer. Bus. Law. J., vol. 33, No. 2, Winter 1995; 54 pages.

Mark Parsley; *Credit Derivatives Get Cracking*, Euromoney n323; Mar. 1996; 12 pages.

Keiran Higgins; *Managing the Risk of Your Global Bond Portfolio*; Global Investor; Apr. 1996; 8 pages; ISSN 0951-3604.

Insurance Regulator; *AIG Breaks Down Exposure by Industry*; Jun. 1994; vol. 4, No. 23; 2 pages.

Simon Hotchin, Paul Dentskevich; *The Risk-Based Way to Asset Valuation*; Corporate Finance Risk Management & Derivatives Yearbook; Apr. 1996; 5 pages.

Peter Heap; *Inside Derivatives: Policies, $300 Million give Sumitomo Unit Triple-A Safety*; The Bond Buyer; Apr. 1995; 2 pages; vol. 313, No. 29326.

Carol Loomis; *The Risk that Won't Go Away (Financial Derivatives0*; Fortune; Mar. 1994; vol. 129, No. 5.

Bret D. Fromson; *Wall Street's Risky Bets 'Derivatives are Popular, Profitable and to Many a Big Danger to Markets*; The Washington Post; Oct. 1993; Final Edition.

Bruce W. Weber: *Information Technology in the Major International Financial Markets*; Apr. 1993; 45 pages; Working Paper IS-93-12; Center for Digital Economy Research.

Description of Forward Rate Agreement; 4 pages.

Form 10-K; Investment Technology Group Inc.—ITG; Mar. 2002; 70 pages; 10k Wizard SEC Power Search.

Eli M. Remolona et al.; *Risk Management by Structured Derivative Product Companies*; Economic Policy Review; Apr. 1996; 19 pages.

Mary Ann Burns; *Opportunity Knocks*; Futures Industry Magazine; Apr./May 2000; 6 pages; Futures Industry Association.

<http://www.marketcenter.com/search/symhelp.jsp.>; 2006; 6 pages.

*Parity* Trademark History; Aug. 25, 1992; 31 pages.

*Principles for the Management of Interest Rate Risk*; Basic Committee on Banking Supervision; Sep. 1997; 39 pages.

Triple Point Technology; *Real-Time Position Management in Today's Power Markets*; 8 pages; available at <www.tpt.com>.

\* cited by examiner

Interest Rate Spread Swap — BLACKBIRD

Bugge Securities LLC

Trader Name Contact DNI                         Date: May 16, 2000

> Bugge Securities LLC sells [ USD ] 200,000,000 of DNLSWP.0,48,0,5B,3L,S.USD at
> a Treasury Spread of 93.125bps to RiRa Financial Corporation
> Trade Date: May 15, 2000, Transaction Time Stamp: May 15, 2000 1:12 PM GMT
> Blackbird Settlement ID: S-20000515131235-20301

| | | | |
|---|---|---|---|
| Buyer: | RiRa Financial Corporation | Seller: | Bugge Securities LLC |
| Notional Amount: | [USD] 200,000,000 | Legal Format: | ISDA |
| Trade Date: | May 15, 2000 | First Fixing: | Today's LIBOR BBA |
| Effective Date: | May 17, 2000 | | |
| Termination Date: | May 17, 2004 | | |
| Mutual Termination Date: | 24 Months from Eff Date. and every 12 Months Thereafter | | |

*Fixed Amounts*

| | | | |
|---|---|---|---|
| Fixed Rate Payer: | RiRa Financial Corporation | Payment Business Center: | London, New York City |
| Fixed Rate: | 7.15358% | Business Day Conv: | Modified Following |
| Day Count Fraction: | 30/360 | | |
| Payment Date(s): | 17th of each November, May | | |

*Floating Amounts*

| | | | |
|---|---|---|---|
| Floating Rate Payer: | Bugge Securities LLC | Payment Business Center: | London, New York City |
| Floating Rate Option: | 3 Month LIBOR-USD | Business Day Conv: | Modified Following |
| Day Count Fraction: | Actual/360 | | |
| Source: | British Bankers Association on Telerate 3750 | | |
| Payment Date(s): | 17th of each August, November, February, May | | |
| Compounding Date(s): | None | | |
| Fixing Date(s): | 2 London business days prior to Effective Date and every payment date except for Termination Date | | |

*Payment Settlement Information*

Bank Name:
ABA#:
Account Name:
Account #:
Account Ref:

*Contact Information*

| | |
|---|---|
| RiRa Financial Corporation: | Contact DNI Voice: (877) 766-9990 Fax: (704) 944-4770 |
| Bugge Securities LLC: | Contact DNI Voice: (877) 766-9990 Fax: (704) 944-4770 |
| DNI Market Monitor: | mike Trader Toll Free: (877) 766-9990 |
| Brokerage: | [USD] $0.00 |

Blackbird Settlement ID: S-20000515131235-20301

Not Final

FIG. 5

SYSTEMS AND METHODS FOR CONDUCTING DERIVATIVE TRADES ELECTRONICALLY

CROSS-REFERENCE TO RELATED APPLICATIONS

This application claims priority to and is a continuation of application Ser. No. 09/859,901, filed May 16, 2001 now abandoned, entitled "Systems and Methods for Conducting Derivative Trades Electronically", which claims the benefit of U.S. Provisional Application No. 60/204,717, filed May 16, 2000, the contents of which are hereby incorporated by reference in their entirety.

FIELD OF THE INVENTION

The present invention generally relates to the trading of financial instruments, and more particularly, to the electronic trading of derivatives.

BACKGROUND OF THE INVENTION

In recent years, commodity exchanges have become more and more dependent upon electronic trading systems. The older manual methods by which trades were conducted have given way to advanced computer systems that have generally mimicked the manual methods of old. These relatively new electronic trading systems have many advantages over the manual systems, including the ability to provide such features as greater accuracy, reduced labor cost, real time market information, more efficient communications over greater distances, and automated record keeping. However, because the markets in which these commodities are being traded are so vastly different from their descriptions to their transaction methodologies, electronic trading systems are generally limited to specific markets such as futures, cash, oil, stock, securities, etc., and sometimes to specific commodities within a single market.

Illustrative of such electronic trading systems are those described in U.S. Pat. No. 5,270,922 to Higgins, U.S. Pat. No. 5,873,071 to Ferstenberg et al., U.S. Pat. No. 4,980,826 Wagner, U.S. Pat. No. 5,168,446 to Wiseman, U.S. Pat. No. 5,924,083 to Silverman, and U.S. Pat. No. 5,970,479 to Sheperd. The systems described in these patents are generally unable to accommodate complex financial instruments because, among other things, these systems apparently treat all financial instruments alike, and therefore, may be incapable of handling more complex financial instruments, such as derivatives, which require a judgment about the financial strength of the opposing counterparties. Trades conducted with some financial instruments such as derivatives create multi-year financial commitments, and therefore, mere credit limit or credit cap systems are insufficient as measuring and managing on institutions credit risk.

For example, derivatives were once considered by many to be too complex to be efficiently handled within an electronic trading system. Particularly, derivative products are typically define by certain terms and conditions, and each of the different types of derivatives products are defined by a different set of terms and conditions. For example, an FRA is defined by a start time, an end time, an over date, and a floating rate option, while an interest rate swap is defined by a start time, an end time, an over date, a floating rate option, a frequency of the fixed coupons, a basis, and a special rule(s) as applicable with some currencies. Accordingly, the variances in the specific information necessary to adequately define the different derivative products have apparently been deterrence to the development of an electronic derivative trading system.

The assignee of the present invention has developed and deployed what is believed to be the first and currently the only electronic trading systems for derivatives in operation. The system is called Blackbird™ (www.blackbird.net), and has received wide acceptance. Nonetheless, the transition to an all-electronic trading system for many derivative traders will most likely be gradual and take some time, relegating many derivative traders to deal with the inefficiencies of such manual trading processes.

For example, the financial markets, and particularly the over-the-counter (OTC) derivative marketplace, have been accessed principally by phone and fax for years. Once a transaction has been completed in this environment, both parties separately draw up their own internal 'trade tickets' without referring to the other organization. These tickets are then entered manually into the respective parties' computer systems for processing. This manual process introduces many opportunities for errors, which requires several layers of manual controls to verify and ensure that the precise details of the transaction to which both parties agreed are the same. This is particularly acute for OTC Derivatives due to the large number of parameters required to define a derivative.

Thus, a heretofore unresolved need exist in the industry for methods and systems that overcome the inadequacies of the manual trading processes without requiring end-to-end electronic trading.

SUMMARY OF THE INVENTION

The present invention, as described herein, comprises methods and systems for providing facilitation of efficient negotiations of trade terms and the generation of an electronic trade ticket. The negotiation process is preferably conducted through a secure online chat program using point-to-point messaging, though the negotiations can take place using the tradition exchanges of phone calls and faxes outside of the confines of an electronic trading system. Once the trade terms have been agreed upon by both parties, then the parties enter an electronic trading system in accordance with the present invention to select the traded financial instrument and to generate an electronic trade ticket with can be stored by the trading system and/or by each of the trading parties. When selecting the instrument, the symbol explode functionality enables the traders to quickly and easily identify the specific instrument being traded. With complex instrument like derivatives, this is desirable because of the effort needed to define all the terms of a derivative can be cumbersome. Advantageously, the electronic trade ticket can be generated in a number of different forms, such as on-screen HTML, paper/fax, XML or a customized format. In fact, the format of the electronic trade ticket can be determined based upon the format or formats designated by the trader or traders, thereby allowing the traders to directly process the electronic trade ticket with conversion to a particular format.

Other features and advantages of the present invention will become apparent to one skilled in the art upon examination of the following drawings and detailed description. It is intended that all such features and advantages be included herein within the scope of the present invention.

BRIEF DESCRIPTION OF THE DRAWINGS

Figure 1:
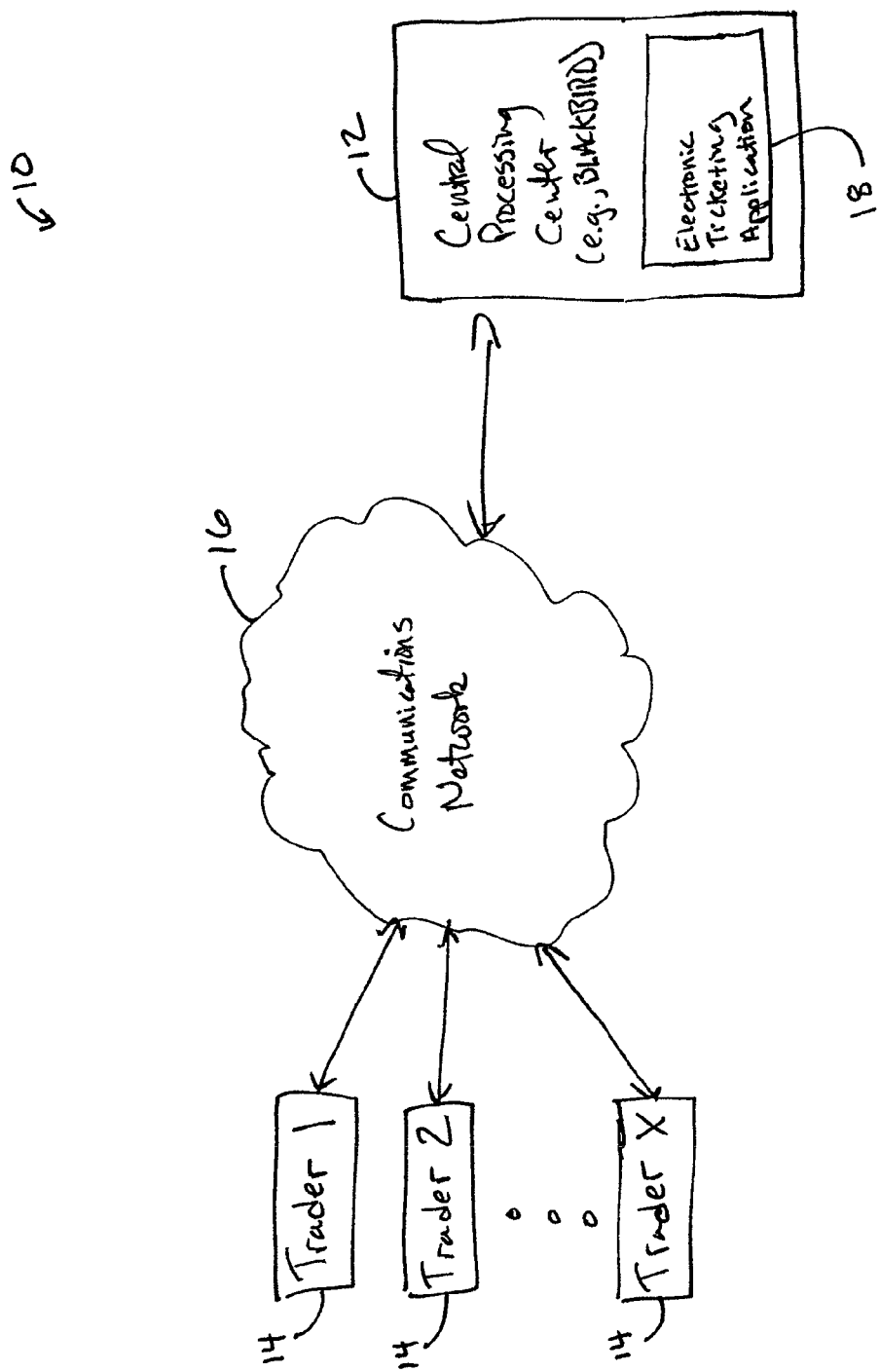

Having thus described the invention in general terms, reference will now be made to the accompanying drawings, which are not necessarily drawn to scale, and wherein:

FIG. 1 is a high-level representation of one possible embodiment of the present invention.

Figure 2:
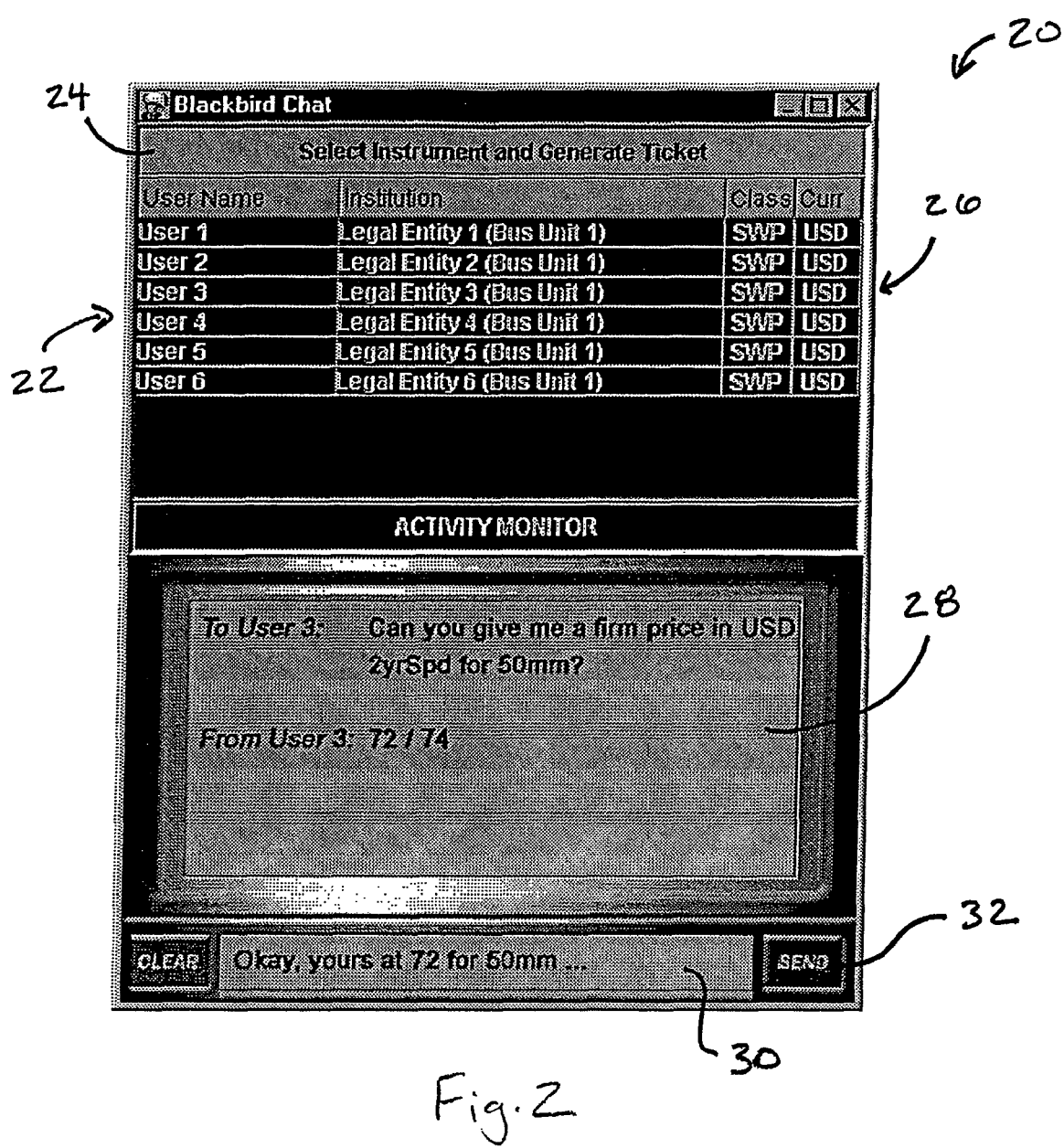

FIG. 2 is an example of a chat interface in accordance with an embodiment of the present invention.

Figure 3:
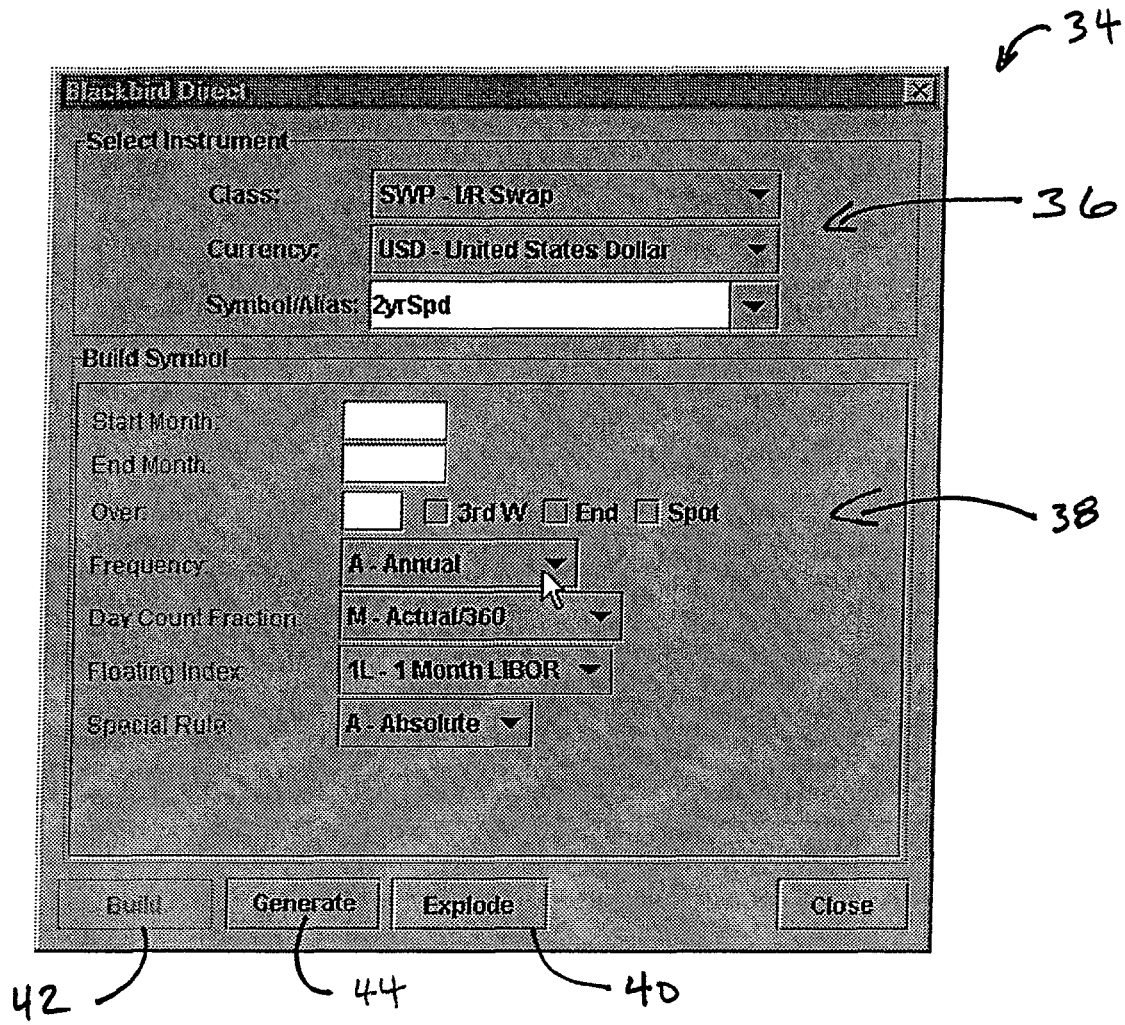

FIG. 3 is an example of an instrument selection interface in accordance with an embodiment of the present invention.

Figure 4:
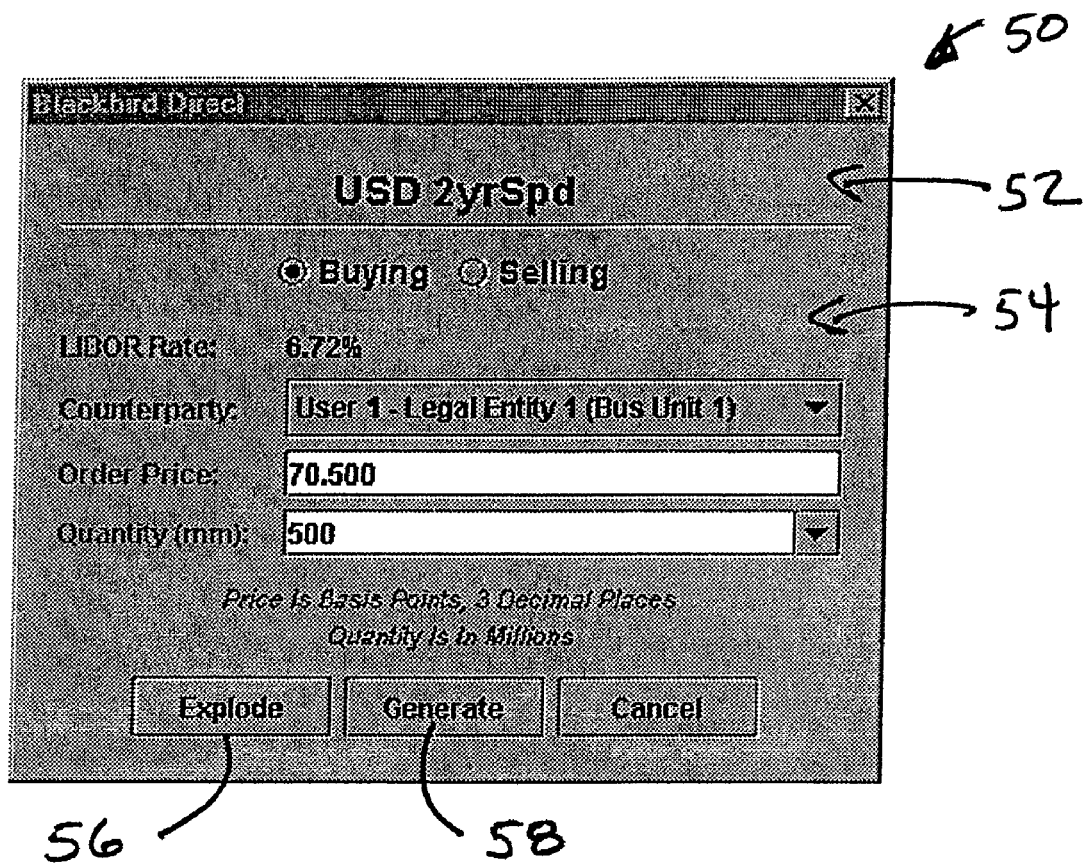

FIG. 4 is an example of an order generate interface in accordance with an embodiment of the present invention.

FIG. 5 is a trade ticket generated in accordance with an embodiment of the present invention.

Figure 6:
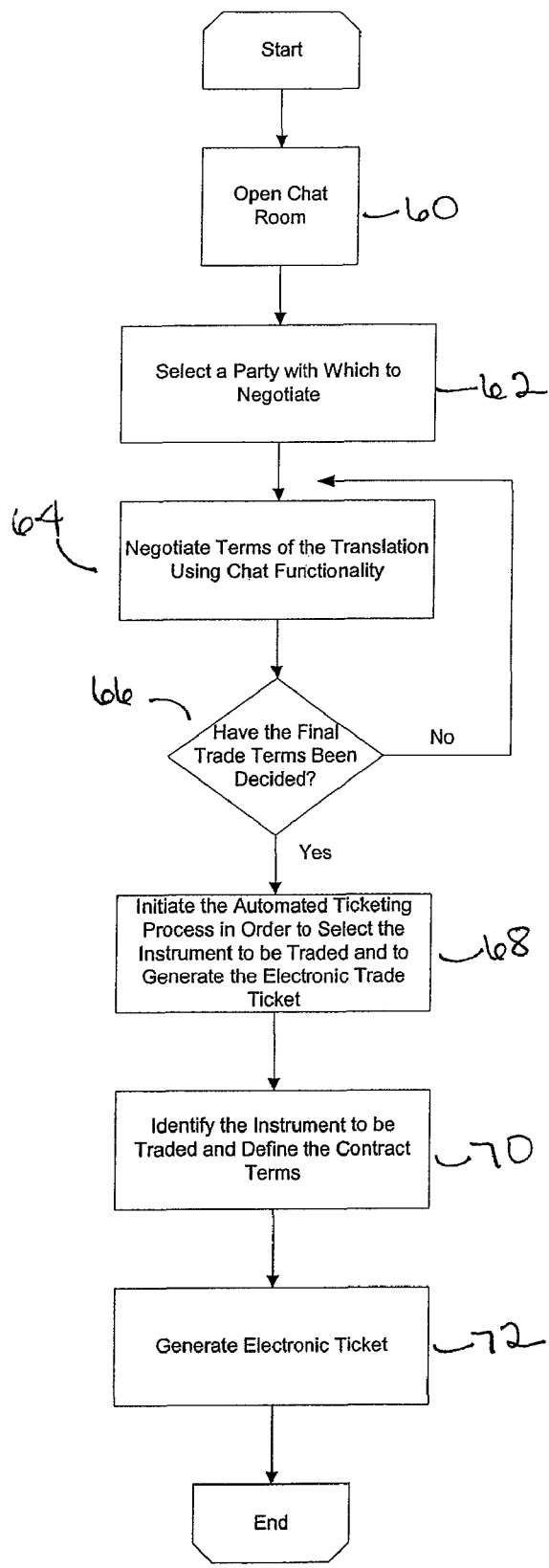

FIG. 6 is a flow-chart illustrating a method in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides great flexibility to derivative traders, such as for negotiation and trading directly through an online trading system, and the generation of an electronic ticket which can then be used to directly load the transaction data to both parties' processing systems automatically and to complete the trade confirmation process. Advantageously, both parties get the same data, at the same time, with essentially no chance of errors being introduced. As a result, traders are able to make trades faster and more efficiently than with prior art systems.

The present invention is preferably implemented as an integral component of an electronic trading system, and while the invention is disclosed in the context of a derivative trading system, the invention is not so limited in utility and functionality. The present invention can be implemented with electronic trading system for virtually any financial instrument, not just derivatives. Nonetheless, the illustrative embodiment of the present invention is described in the context of the Blackbird™ System as disclosed in the co-pending patent application Ser. No. 09/169,906, which is hereby incorporated by reference as if set forth in full.

With reference to FIG. 1, an electronic trading system 10 in accordance with the present invention includes a central processing center server 12 which is in communication with the traders computer 14 via the communications network 16. The present invention can be implemented as an integrated or bundle software component, such as the electronic ticket application 18, of an underlying electronic trading system, such as the Blackbird™ system.

The central processing center 12 and the traders 14 preferably operate in conjunction with one another to implement an electronic trading system with which the present invention operates, such as in a client-server configuration, though the system architectures of the underlying electronic trading system does not materially impact the present invention. Thus, the breath and scope of the implementations available for the trader and central processing center elements extend to the present invention and its implementation. For example, should the trader workstation interface of the electronic trading system be implemented on a PDA device, the interfaces of the present invention will likewise be implemented through the similar PDA interface.

In accordance with the present invention, the trader 14 not only communicate with the central processing center through the communications network 16, they can communicate with one another. The communications network 16 can be any data or voice network capable of interfacing two or more parties. Therefore, the communications network may support, for example, Internet protocol, facsimile and voice communications between the parties and between the traders 14 and central processing center 12. In addition, it is preferable that some traders 14 will be connected to more that one of communications networks 16 so that in the event of a failure of the primary network, there will be an immediate backup in place. With this multiple access method, the preferred embodiment of the invention is able to offer the widest possible access to potential users.

The electronic ticket application 18 provides a trader with the ability to generate an electronic ticket once a transaction has been agreed upon and for this electronic ticket to be in a standard and easy to use/process format. While the traders may negotiate the trade terms using whatever means they wish, it is preferable that they utilize a point-to-point messaging, such as a secure chat application provided by the underlying electronic trading system to allow the traders to negotiate on-line, in a manner substantially similar to that historically done over the phone. Alternatively, should the traders wish to continue to use the telephone, they can advantageously use the present invention to generate electronic tickets and point-to-point messages and confirmations. The point-to-point messaging can take many forms as will be appreciated by those skilled in the art, but is preferably a live chat session.

The electronic trading system preferably has trade profile information for each registered trader, include for example, address, legal entity (LE), business unit (BU), contact information, and settlement details. In the Blackbird™ system, symbology provides for the definition of trade terms in, for example, price, quantity, buyer/seller, trade date (if necessary), and term negotiation items.

The electronic ticketing application 18 enables the traders to select a financial instrument to be traded and generate a trade ticket. The selection process may be as simple as the selection from a listing or as complex as the building of a symbol with any necessary terms. Advantageously, symbology of the Blackbird™ system enables traders to explode a symbol or alias to see the terms defining the derivative. This allows traders to quickly come to an agreement on an instrument to be traded and confirm the terms of that instrument without a long and drawn out process of verbally reading through the terms over the phone or through faxes, which is a tedious and time consuming process. Once the instrument has been selected, the electronic ticketing application 18 generates the electronic ticket for the traders. The electronic trade tickets and confirmations can be generated and transmitted to the traders for electronic processing using XML or other standard message protocols. The electronic trade tickets are particularly advantageous for record keeping and trade status within the lifecycle of the trade.

With reference to FIGS. 2-5, the operation of an embodiment of the present invention is provided herein below. It will be understood that each block of the flowchart illustration, and combinations of the blocks in the flowchart illustration, can be implements by computer program instructions. These computer program instructions may load onto a computer or other programmable apparatus to produce a machine, such that the instructions will execute on the computer or other programmable apparatus to create means for implementing the functions specified in the flowchart block or blocks. These computer program instructions may also be stored in a computer-readable memory that can direct the computer or other programmable apparatus to function in a particular manner, such that the instructions stored in the computer-readable memory produces an article of manufacturing including instructions which implement the function specified in the flowchart block or blocks.

The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the function specified in the flowchart block or blocks.

Accordingly, blocks within the flowchart illustrations support combinations of means for performing the specified functions and combinations of steps for performing the specified functions. It will be understood that each block of the flowchart illustrations, and the combinations of blocks in the flowchart illustrations, can be implemented by a special purpose hardware-based computer systems which perform the specified functions or steps, or combinations of special purpose hardware and computer instructions.

Initially, a trader wanting to enter into a private two-way negotiation initializes the chat screen 20, as illustrated in FIG. 2. The chat screen is preferably initialized from one of the interfaces of the Blackbird™ system. The trader who wants to initiate a chat conversation clicks on the name of another trader from the list 22. All or some subset of available users preferably are included in list 22, including, for example, full name, legal entity, normal class of instrument traded and currency traded. This information can be retrieved from one or more of the databases associated with the electronic trading system 10. This enables a specific trader at another institution to be quickly and easily identified. In addition, this enables the two users to privately negotiate the terms of the trade and only the two parties to the session can see the conversation. Note, however, a trader may select more than one trader to communicate with so that the messages generated in the chat session are communicated to each of the traders participating in the session. While chat negotiations are typically preferred, the traders may communicate by alternative means such as by a telephone or facsimile, as historically done.

A Select Instrument and Generate Ticket Button 24 can be selected to allow the user to select the financial instrument to be traded and initiate the generation of the electronic ticket, which can be used by either party to automatically load the transaction data to their respective processing system, as discussed in more detail below. A display window 26 identifies the traders presently logged into the electronic trading system 10. This is essentially the list from which the trader that wants to initiate private negotiations can choose someone with which to negotiate. From left to right, each column includes characteristics of each trader which may identify, for example, the following: name; institution name (legal entity name and/or business unit name); the type of derivative/financial instrument the user trades most often; and the preferred currency of that trader.

A chat display window 28 provides a chronological sequence of statements made between the traders. The window 28 may list, for example, the following information (some of which is not shown in the embodiment illustrated): the time the comment was made; the name of the person making the statement; and the message the person typed in. The message display window 30 provides the message being typed (i.e., inputted) by the trader as she/he types it. When the trader selects the enter button on the keyboard, or the send button 32 on the chat screen 20, the message in the message display window 30 is sent to the other trader(s) and is inserted as last entry in the chat display window 28.

Once the traders have decided on the terms of the trade during the chat session, and have come to an agreement on terms, either one can initiate the trade ticket generation by selecting the Select Instrument and Generate Ticket button 24 which launches an instrument selection screen 34, as illustrated in FIG. 3, which allows the user to (1) select from one or more down-down menus 36 (for example) the type of financial instrument (e.g., class, currency, and/or symbol, as defined by the symbology of the Blackbird™ system) being traded and (2) select the appropriate terms of the transaction via selectable options 38 as described by the symbology of Blackbird™ system. This includes the symbol, parameters, trade date, currency, etc. Alternatively, the trader may explode the symbol via the Explode button 40 to see the specifics of the transaction including start and end dates of the transaction, floating rate options, accrual basis etc. Yet another alternative is that the traders can build their own instrument via Build button 42. This enables the traders to ensure that they both agree to all the terms.

Once the trader has selected the instrument and built the Symbol, the trader selects the Generate button 44 of screen 34 which launches the order generate screen 50, as illustrated in FIG. 4. This interface is similar in function to "Place Order" Screen in the Blackbird™ System. The order generate screen 50 presents the selected instrument in window 52, and enables the traders to select the specific contract and terms via selectable options 54. For example, the traders designate the Buyer and Seller, the financial institution party to the trade, the price, the quantity, any additional terms that need to be negotiated (e.g., such as those defined via Term Negotiation), etc. If desired, the trader can explode the instrument via Explode button 56. The trader then selects the Generate button 58 to produce a trade ticket (also referred to as the Confirmation Ticket), an illustrative example of which is provided in FIG. 5 (note that only the first page of the trade ticket is provided in FIG. 5, as will be appreciated by one of ordinary skill in the art).

In accordance with the Blackbird™ system, once both traders confirm, they are automatically given the option to enter Term Negotiation as if the trade had been conducted on the Blackbird™ System.

When the trader initiating the trade selects the Generate Button 58 of the generate order screen, both traders receive an electronic trade ticket. The trade ticket can be in any or all the following formats, or any other suitable format: on screen/HTML, included in the Blackbird™ Trade Blotter, paper/fax Blackbird™ ticket, ISDA Confirmation format, XML, or flat file. In an embodiment of the present invention, the trader's preferential format can be pre-selected by the trader or his/her legal entity so that at a trade ticket generated for that trader is formatted in the pre-selected format. This may eliminate the need to convert the electronic trade ticket to another format for processing by the trader's system.

With reference to FIG. 6, a flowchart illustrating a method of the operation of the electronic ticketing application 18 in accordance with the embodiment of the present invention is provided. At step 60, a trader opens the secure chat room application, which preferably is an integral component of the Blackbird™ system. At step 62, the trader then selects a party with which to negotiate from a provided list of available counterparties. An advantage of integrating the electronic ticketing application 18 with an electronic trading system is that information about each potential counterparty can be accessed and presented to user with a list of available traders. Once the trader has selected one or more potential counterparties, the parties begin to negotiate the terms of a transaction using the chat functionality, as is well known, as illustrated in step 64. If it is determined at step 66 that the traders have decided the final terms of the transaction, one of the traders initiates the automated ticketing process by selecting the Select Instrument and Generate Ticket button. Alternatively, if it is determined at step 66 that the parties have not decided the final terms of the deal, then the parties continue to negotiate terms at step 64.

Once the traders have selected the Select Instrument and Generate Ticket button, the traders identify the instrument to be traded and the contract terms. Next, at step 72, the traders request that an electronic ticket be generated in accordance with the identified instrument and terms.

Once a trade ticket is generated, then it is stored in a database (which could be a Blackbird™ system database for a database of a trader or other third party having a requisite permission and/or authorization), thereby enabling the following functionality: recall at a later time, audit checks, automatic confirms, process status (i.e., as the ticket is processed, messages can be received and the status updated). Examples include "faxed", "XML file sent", "agreed", "processed by . . . ", "Matured" etc.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    initiating an electronic chat session on two trader computing devices of an electronic trading system between at least two traders using the trader computing devices to negotiate terms of a transaction of financial instrument, wherein the trader computing devices are communicably connected to each other and to a central processing center via a communications network;
    transmitting, by one of the trader computing devices, trader input indicating a selected financial instrument agreed upon during the electronic chat session by the traders to transact;
    receiving the trader input at the central processing center of the electronic trading system via one of the trader computing devices indicating the selected financial instrument agreed upon during the electronic chat session by the traders to transact;
    transmitting, by one of the trader computing devices, trader input indicating contract terms defining the transaction of the financial instrument agreed upon during the electronic chat session by the traders;
    receiving the trader input at the central processing center of the electronic trading system via one of the trader computing devices indicating the contract terms defining the transaction of the financial instrument agreed upon during the electronic chat session by the traders;
    retrieving, by the central processing center of the electronic trading system, a format pre-selected for each of the traders;
    generating, by the central processing center of the electronic trading system, an electronic trade ticket for the transaction, wherein generating the electronic trade ticket comprises formatting the electronic trade ticket for each of the traders based upon the format pre-selected for each of the traders; and
    transmitting, by the central processing center of the electronic trading system, the electronic trade ticket to the traders.

2. The method of claim 1, wherein generating the electronic trade ticket comprises generating the electronic trade ticket in a format of a fax document.

3. The method of claim 1, wherein generating the electronic trade ticket comprises generating the electronic trade ticket in a format of an XML file.

4. The method of claim 1, further comprising exploding the selected financial instrument to reveal to a trader definitional components of the financial instrument.

5. The method of claim 1, wherein receiving the trader input at the central processing center of the electronic trading system indicating the selected financial instrument comprises receiving an indication of one or more of a class, a currency and a symbol of the financial instrument.

6. The method of claim 1, further comprising:
    transmitting, by one of the trader computing devices of the at least two traders, trader input indicating confirmation, by each of the at least two traders, of the contract terms of the electronic trade ticket; and
    receiving the trader input at the central processing center of the electronic trading system indicating confirmation, by the at least two traders, of the contract terms of the electronic trade ticket.

7. The method of claim 1, further comprising automatically loading the electronic trade ticket into the processing systems of the at least two traders and automatically processing the electronic trade ticket by the processing systems.

8. The method of claim 1, wherein initiating the electronic chat session comprises presenting a chat screen to the traders comprising: a display window identifying the traders presently logged into the system; a chat display window configured to provide a chronological sequence of statements made between the traders in the electronic chat session; and a message display window configured to present messages for input to the electronic chat session and to be display in the chat display window.

9. The method of claim 1, wherein initiating the electronic chat session comprises receiving trader input from one of the at least two traders indicating a plurality of other traders presently logged into the system with whom to conduct the electronic chat session.

10. The method of claim 1, wherein initiating an electronic chat session comprises initiating a private chat session between the traders.

11. The method of claim 1, further comprising:
    automatically loading the electronic trade ticket into a processing system of at least one of the traders; and
    automatically processing the electronic trade ticket by the processing system.

12. A computer program product comprising a computer-readable memory having control logic stored therein for execution on a central processing computer of an electronic trading system, said control logic comprising:
    a first code configured to initiate an electronic chat session of an electronic trading system between at least two traders to negotiate terms of a transaction of financial instrument;
    a second code configured to receive trader input into the system indicating a selected financial instrument agreed upon during the electronic chat session by the traders to transact;

a third code configured to receive trader input into the system indicating contract terms defining the transaction of the financial instrument agreed upon during the electronic chat session by the traders;

a fourth code configured to retrieve a format pre-selected for each of the traders;

a fifth code configured to generate an electronic trade ticket for the transaction, wherein the fifth code is further configured to format the electronic trade ticket for each of the traders based upon the format pre-selected for each of the traders; and a sixth code configured to transmit the electronic trade ticket to the traders.

13. The computer program product of claim 12, further comprising seventh code configured to explode the selected financial instrument to reveal to a trader definitional components of the financial instrument.

14. The computer program product of claim 12, wherein the second code is further configured to receive an indication of one or more of a class, currency, and symbol of the financial instrument.

15. The computer program product of claim 12, further comprising seventh code configured to automatically load the electronic trade ticket into the processing systems of the at least two traders.

16. The computer program product of claim 12, further comprising seventh code configured to receive confirmation of the contract terms of the electronic trade ticket from at least one of the traders.

17. The computer program product of claim 12, wherein the first code is further configured to present a chat screen to the traders comprising: a display window identifying the traders presently logged into the system; a chat display window configured to provide a chronological sequence of statements made between the traders in the electronic chat session; and a message display window configured to present messages for input to the electronic chat session and to be display in the chat display window.

18. The computer program product of claim 12, wherein the first code is further configured to receive trader input from one of the at least two traders indicating a plurality of other traders presently logged into the system with whom to conduct the electronic chat session.

19. A method, comprising:

initiating an electronic chat session between at least two traders using at least two trader computing devices of an electronic trading system to negotiate terms of a transaction of financial instrument, wherein the trader computing devices are communicably connected to each other and to a central processing center via a communications network;

receiving trader input into the central processing center of the electronic trading system via one of the trader computing devices indicating a selected financial instrument agreed upon during the electronic chat session by the traders to transact;

receiving trader input into the central processing center of the electronic trading system via one of the trader computing devices indicating contract terms defining the transaction of the financial instrument agreed upon during the electronic chat session by the traders;

retrieving, by the central processing center of the electronic trading system, a format pre-selected for each of the traders;

generating, by the central processing center of the electronic trading system, an electronic trade ticket for the transaction, wherein generating an electronic trade ticket comprises formatting the electronic trade ticket for each of the traders based upon the format pre-selected for each of the traders; and transmitting, by the central processing center of the electronic trading system, the electronic trade ticket to the traders.

\* \* \* \* \*